United States Patent
Han et al.

(10) Patent No.: US 12,182,490 B2
(45) Date of Patent: Dec. 31, 2024

(54) SEMICONDUCTOR DESIGN AUTOMATION SYSTEM AND COMPUTING SYSTEM INCLUDING THE SAME

(71) Applicant: Samsung Electronics Co., Ltd., Suwon-si (KR)

(72) Inventors: Song-Yi Han, Hwaseong-si (KR); Jae Min Kim, Yongin-si (KR); Jae Ho Kim, Seoul (KR); Ji-Seong Doh, Hwaseong-si (KR); Kang-Hyun Baek, Seoul (KR); Young Kyou Shin, Yongin-si (KR); Seong Hun Jang, Suwon-si (KR); Young Jun Cho, Seoul (KR); Yun Ji Choi, Incheon (KR)

(73) Assignee: Samsung Electronics Co., Ltd. (KR)

( * ) Notice: Subject to any disclaimer, the term of this patent is extended or adjusted under 35 U.S.C. 154(b) by 46 days.

(21) Appl. No.: 18/316,405

(22) Filed: May 12, 2023

(65) Prior Publication Data

US 2023/0281375 A1 Sep. 7, 2023

Related U.S. Application Data

(63) Continuation of application No. 17/395,594, filed on Aug. 6, 2021, now Pat. No. 11,687,696.

(30) Foreign Application Priority Data

Nov. 4, 2020 (KR) .................. 10-2020-0145942

(51) Int. Cl.
G06F 30/398 (2020.01)
G06F 30/12 (2020.01)
G06F 119/02 (2020.01)

(52) U.S. Cl.
CPC ............ *G06F 30/398* (2020.01); *G06F 30/12* (2020.01); *G06F 2119/02* (2020.01)

(58) Field of Classification Search
CPC ..................................... G06F 30/398
USPC ........................................... 716/111
See application file for complete search history.

(56) References Cited

U.S. PATENT DOCUMENTS

| | | |
|---|---|---|
| 7,949,618 B2 | 5/2011 | Bischoff et al. |
| 8,453,102 B1 | 5/2013 | Pack et al. |
| 8,548,788 B2 | 10/2013 | Joshi et al. |
| 8,832,611 B2 | 9/2014 | Liu et al. |
| 10,018,996 B2 | 7/2018 | Bomholt et al. |
| 10,248,747 B1 | 4/2019 | Mukherjee et al. |

(Continued)

*Primary Examiner* — Eric D Lee

(74) *Attorney, Agent, or Firm* — Myers Bigel, P.A.

(57) ABSTRACT

A semiconductor design automation system comprises a simulator configured to generate simulation data, a recovery module configured to correct a sampling error of the simulation data to generate recovery simulation data, a hardware data module configured to generate real data, a preprocessing module configured to preprocess the real data to generate preprocessed real data, a database configured to store the recovery simulation data and the preprocessed real data, a first graphic user interface including an automatic simulation generator configured to generate a machine learning model of the recovery simulation data and the preprocessed real data and generate predicted real data therefrom, and a second graphic user interface including a visualization unit configured to generate a visualized virtualization process result from the machine learning model.

20 Claims, 14 Drawing Sheets

(56) References Cited

U.S. PATENT DOCUMENTS

| | | |
|---|---|---|
| 10,387,596 B2 | 8/2019 | Joshi et al. |
| 10,452,793 B2 | 10/2019 | Joshi et al. |
| 10,489,212 B2 | 11/2019 | Smith et al. |
| 10,678,973 B2 | 6/2020 | Chuang et al. |
| 10,691,864 B2 | 6/2020 | Wang et al. |
| 10,735,115 B2 * | 8/2020 | Hueber ................ H04B 1/0017 |
| 2018/0089349 A1 | 3/2018 | Rezgui |

* cited by examiner

SEMICONDUCTOR DESIGN AUTOMATION SYSTEM AND COMPUTING SYSTEM INCLUDING THE SAME

CROSS-REFERENCE TO RELATED APPLICATION

This application is a continuation of and claims priority to U.S. patent application Ser. No. 17/395,594 filed on Aug. 6, 2021, which claims priority from Korean Patent Application No. 10-2020-0145942 filed on Nov. 4, 2020, and all the benefits accruing therefrom under 35 U.S.C. 119, the contents of which in its entirety are herein incorporated by reference.

FIELD

The present disclosure relates to a semiconductor design automation system and a computing system including the same.

BACKGROUND

As high integration and miniaturization of semiconductors have progressed, factors in each step of designing and manufacturing semiconductor devices may interact in a complex manner, which may cause various unintended electrical characteristics of the semiconductor devices. In order to overcome limitations of semiconductor processes and devices, to understand phenomena, and to reduce experimental costs, demand for a technology computer aided design (TCAD) process-device simulation environment based on a physical simulation has been increasing. Further, in order to provide precise product specifications of a semiconductor device, it may be necessary to predict and simulate the characteristics of the semiconductor device.

SUMMARY

Aspects of the present disclosure provide a semiconductor design automation system for improving the reliability and speed in generating a semiconductor process model and a semiconductor process prediction model, by executing machine learning based on a database in which simulation data and real data are automatically loaded.

Aspects of the present disclosure also provide a computing system including a semiconductor design automation system for improving the reliability and the speed in generating a semiconductor process model and a semiconductor process prediction model, by executing machine learning based on a database in which simulation data and real data are automatically loaded.

Aspects of the present disclosure also provide a semiconductor design automation method for improving the reliability and the speed in generating a semiconductor process model and a semiconductor process prediction model, by executing machine learning based on a database in which simulation data and real data are automatically loaded.

According to an aspect of the present disclosure, there is provided a semiconductor design automation system comprising a simulator configured to generate simulation data, a recovery module configured to correct a sampling error of the simulation data to generate recovery simulation data, a hardware data module configured to generate real data, a preprocessing module configured to preprocess the real data to generate preprocessed real data, a database configured to store the recovery simulation data and the preprocessed real data, a first graphic user interface including an automatic simulation generator configured to generate a machine learning model of the recovery simulation data and the preprocessed real data and generate predicted real data therefrom, and a second graphic user interface including a visualization unit configured to generate a visualized virtualization process result from the machine learning model.

According to an aspect of the present disclosure, there is provided a semiconductor design automation system comprising an automation module including a simulator configured to generate simulation data, a recovery module configured to correct a sampling error of the simulation data to generate recovery simulation data, a hardware data module configured to generate real data, a preprocessing module configured to preprocess the real data to generate preprocessed real data, a database configured to store the recovery simulation data and the preprocessed real data, an adjustment maintain module including a first graphic user interface including an automatic simulation generator configured to generate a machine learning model of the recovery simulation data and the preprocessed real data and generate predicted real data therefrom, and a virtualization visualization module including a second graphic user interface configured to generate a visualized virtualization process result from the machine learning model.

According to an aspect of the present disclosure, there is provided a computing system comprising an input/output device, a processor configured to control the input/output device through a bus, and a memory comprising a non-transitory computer readable storage medium configured to store a semiconductor design automation simulation program that is configured to be executed by the processor, wherein the semiconductor design automation simulation program includes a simulator configured to generate simulation data, a recovery module configured to correct a sampling error of the simulation data to generate recovery simulation data, a hardware data module configured to generate real data, a preprocessing module configured to preprocess the real data to generate preprocessed real data, a database configured to store the recovery simulation data and the preprocessed real data, a first graphic user interface including an automatic simulation generator configured to generate a machine learning model of the recovery simulation data and the preprocessed real data and generate predicted real data therefrom, and a second graphic user interface configured to generate a visualized virtualization process result from the machine learning model.

According to an aspect of the present disclosure, there is provided a semiconductor design automation method comprising generating, via a simulator, simulation data, and correcting, via a recovery module, a sampling error of the simulation data to generate recovery simulation data; generating, via a hardware data module, real data, and preprocessing, via a preprocessing module, the real data to generate preprocessed real data; storing, via a database, the recovery simulation data and the preprocessed real data; generating, via a first graphic user interface including an automatic simulation generator, a machine learning model of the recovery simulation data and the preprocessed real data to generate predicted real data therefrom; and generating, via a second graphic user interface a visualized virtualization process result from the machine learning model.

Aspects of the present disclosure are not restricted to those set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION OF THE EMBODIMENTS

Figure 1:
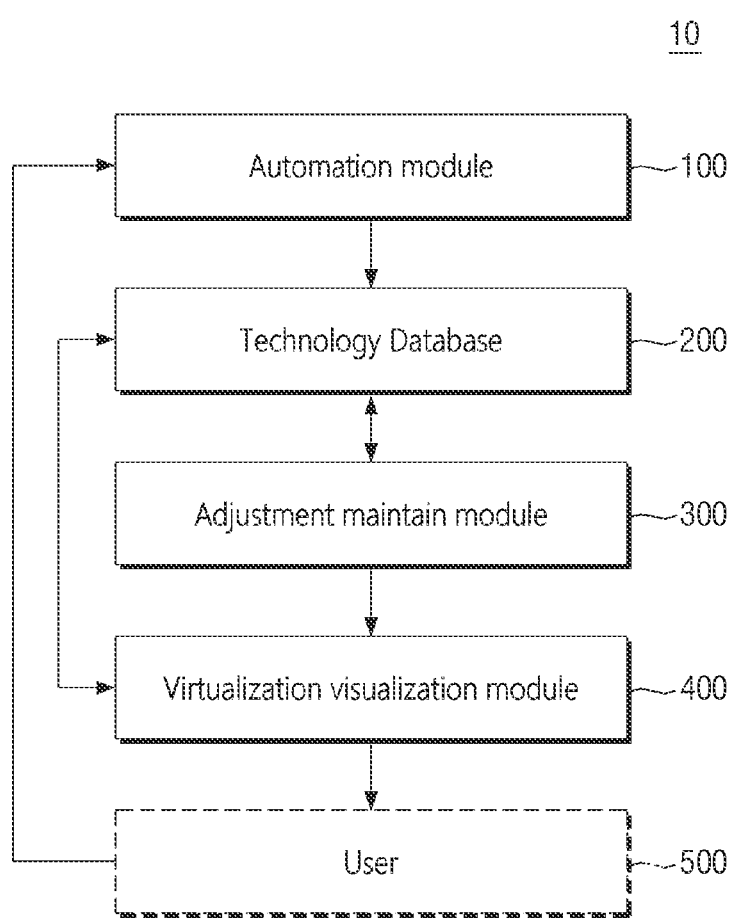
FIGS. 1 and 2 are example block diagrams illustrating a semiconductor design automation system according to some embodiments.
Figure 2:
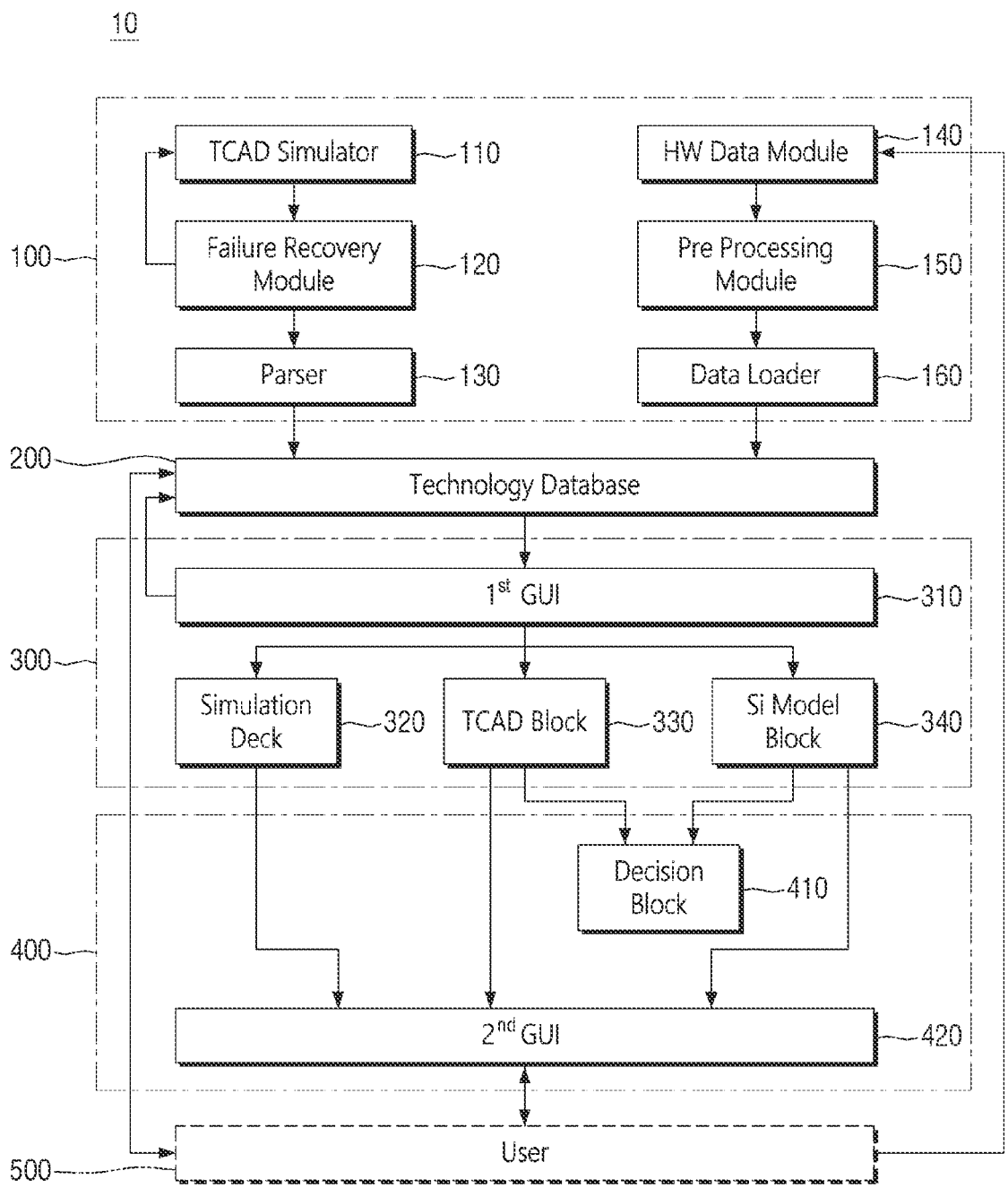

FIGS. 1 and 2 are example block diagrams illustrating a semiconductor design automation system according to some embodiments.

Referring to FIGS. 1 and 2, a semiconductor design automation system 10 according to some embodiments includes an automation module 100, a database 200 (also referred to as a technology database), an adjustment or consistency maintain module 300, and a virtualization visualization module 400, for output to a user 500.

The semiconductor device automatically designed by the semiconductor design automation system 10 according to some embodiments may be, e.g., a FinFET semiconductor device, a DRAM semiconductor device, a NAND semiconductor device, a VNAND semiconductor device, or the like. However, these are only examples, and the semiconductor device is not limited thereto.

The semiconductor design automation system 10 according to some embodiments may be implemented as an integrated device, and thus may also be referred to as an integrated circuit design automation apparatus. The semiconductor design automation system 10 may be provided as a dedicated device for designing the integrated circuit of the semiconductor device, and/or may be a computer for driving various simulation tools or design tools. The semiconductor design automation system 10 may be a fixed computing system such as a desktop computer, a workstation, a server, or the like, or may be a portable computing system such as a laptop computer or the like.

The automation module 100 includes a simulator 110, a failure recovery module 120 (also referred to herein as a recovery module), a parser 130, a hardware data module 140, a preprocessing module 150, and a data loader 160.

The simulator 110 may perform a semiconductor device modeling. The semiconductor device modeling may be performed using, e.g., a technology computer aided design (TCAD). For example, the semiconductor device modeling may use a process TCAD in which a semiconductor device manufacturing process is modeled. However, the present disclosure is not limited thereto, and the semiconductor device modeling may also use a device TCAD in which the operation of the semiconductor device is modeled. For example, a TCAD tool for performing TCAD may be Synopsys, Silvaco, Crosslight, Cogenda Software|VisualT-CAD, Global TCAD Solutions, Tiberlab, or the like.

Further, the simulator 110 may simulate the mechanical characteristics and the physical characteristics of the semiconductor device as well as the electrical characteristics of the semiconductor device. The simulation result obtained by the simulator 110 may also be used as an input for a device simulation or a device-circuit integrated simulation. In the case of a process-device-circuit characteristics integrated simulation, a device may be a single device or a plurality of devices.

The semiconductor device modeling may be performed by a physics-based thin film deposition process simulation and an etching process simulation based on a semiconductor layout to implement a modeled semiconductor device. Here, the semiconductor device modeling is a concept encompassing the arrangement of components of a semiconductor device, numerical values of the components of the semiconductor device (e.g., a thickness of a thin film, a depth of a portion removed by an etching process, physical characteristics of a contained material, and the like), and may also be referred to as a target spec. Here, the numerical values of the components may mean not only fixed constants but also process variables that may be selected or changed in the physics-based thin film deposition process simulation and the etching process simulation.

The recovery module 120 automatically recovers errors of a plurality of samples generated by the simulator 110. For example, the recovery module 120 may correct or otherwise recover the errors of the plurality of samples generated by the simulator 110 using log, status analysis, or the like, and transfer the recovery simulation data to the parser 130 or the simulator 110.

The parser 130 may receive the recovery simulation data (e.g., the plurality of samples in which the errors are recovered) from the recovery module 120 and perform parsing. The parser 130, as a part of a compiler, for example, may perform compiling on the recovery simulation data.

Hereinafter, the automatic error recovery operation performed on the simulation data using the simulator 110, the recovery module 120, and the parser 130 will be described with reference to the flowchart of FIG. 3.

Figure 3:
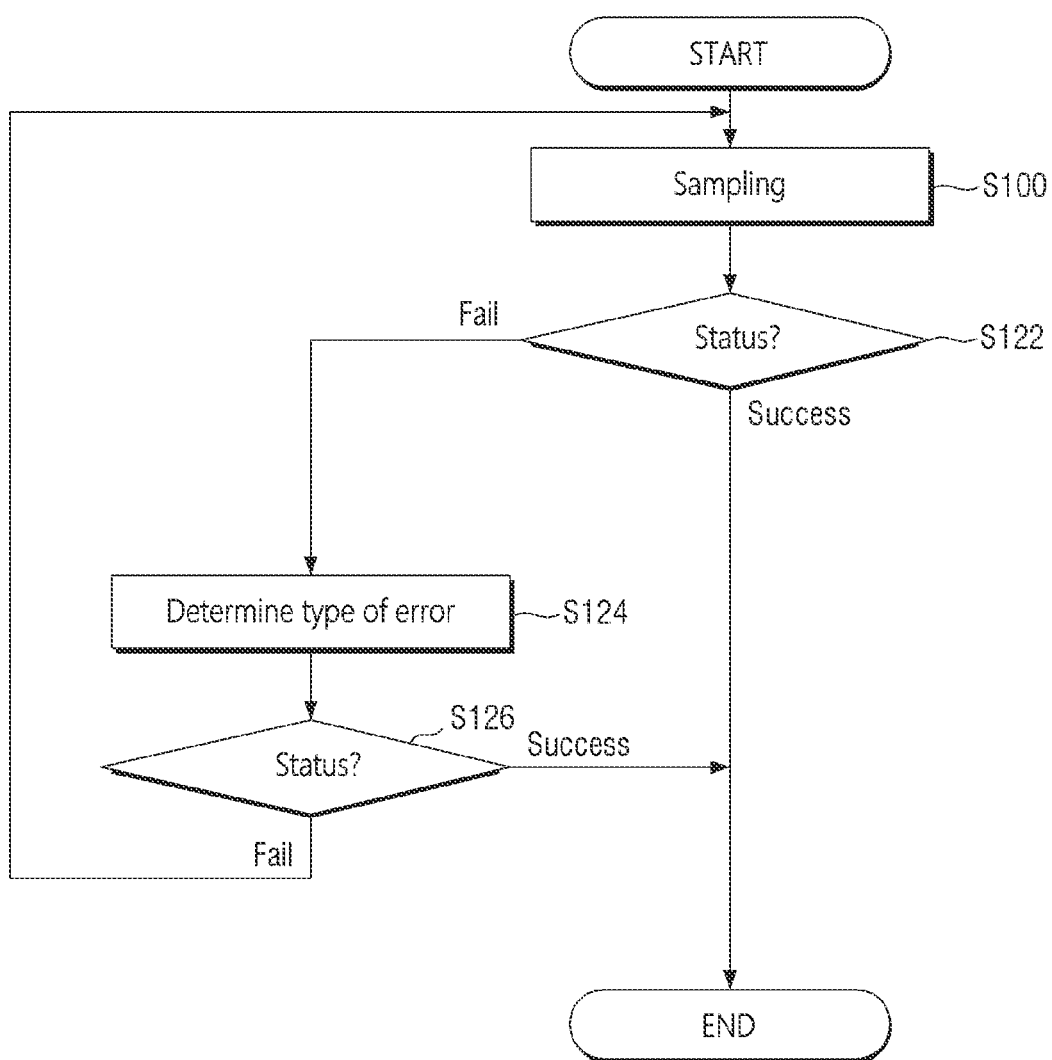
FIG. 3 is an example flowchart illustrating the recovery operation according to some embodiments.

FIG. 3 is an example flowchart illustrating the recovery operation according to some embodiments.

Referring to FIGS. 1 to 3, simulation data (e.g., a plurality of samples) is extracted by combining the modeled semiconductor shape implemented by the semiconductor device modeling performed by the simulator 110 and the process variables used for the physics-based thin film deposition process simulation and the etching process simulation (step S100).

For example, the simulation data (e.g., the plurality of samples) may be extracted by independent linear combination of the process variables used for the physics-based thin film deposition simulation and the etching process simulation. For example, the plurality of samples may be extracted by Latin hypercube sampling (LHS).

The simulation data (e.g., the plurality of samples) may be extracted by combining only the process variables used for simulating some selected processes without combining the process variables used for simulating all processes. The processes and the process variables selected to extract the plurality of samples may be processes and process variables that are dominant in determining the semiconductor shape. In some embodiments, the processes selected to extract the plurality of samples may be a thin film deposition process for forming material films of components of a completed semiconductor device, and an etching process or a chemical mechanical polishing (CMP) process for removing a part of the formed film, and the process variables may be the deposition time of the thin film deposition process and/or the thickness of the thin film formed as a result of the thin film deposition process, the etching time of the etching process and/or the etching depth obtained as a result of the etching process, and the execution time of the CMP process and/or the removed thickness or the residual thickness obtained as a result of the CMP process.

The extracted simulation data (e.g., the plurality of samples) may be a plurality of modeled semiconductor shapes implemented by the semiconductor shape modeling performed on other process variables. For example, the plurality of extracted samples may be a plurality of modeled semiconductor shapes implemented by performing the semiconductor shape modeling while varying the process variables such as a thin film thickness, a thin film deposition time, an etching depth, an etching time, or the like.

Then, the recovery module 120 may check the status of the simulation data (e.g., the plurality of samples) to check whether or not an error has occurred (Fail or Success) (step S122).

If the recovery module 120 determines that no error has occurred in the simulation data (Success), the simulation data may be transferred to the parser 130.

If the recovery module 120 determines that an error has occurred in the simulation data (Fail), the type of the error that has occurred in the simulation data is determined (step S124).

The type of the error determined by the recovery module 120 may be an abnormal structure, a communication error, an action failure, a system failure, or the like.

After the error that has occurred in the simulation data is determined, the recovery module 120 recovers the error and determines that the error is recovered again (step S126). When the recovery module 120 determines that the error that has occurred in the simulation data is recovered (Success), the simulation data is transferred to the parser 130.

If the recovery module 120 still determines that the error has occurred in the simulation data (Fail), the simulation data may be generated again by the simulator 110.

Referring back to FIGS. 1 and 2, the simulation data in which the error is recovered by the simulator 110 may be parsed by the parser 130 and then loaded in the database 200. The type of the simulation data parsed by the parser 130 will be described with reference to FIG. 4.

Figure 4:
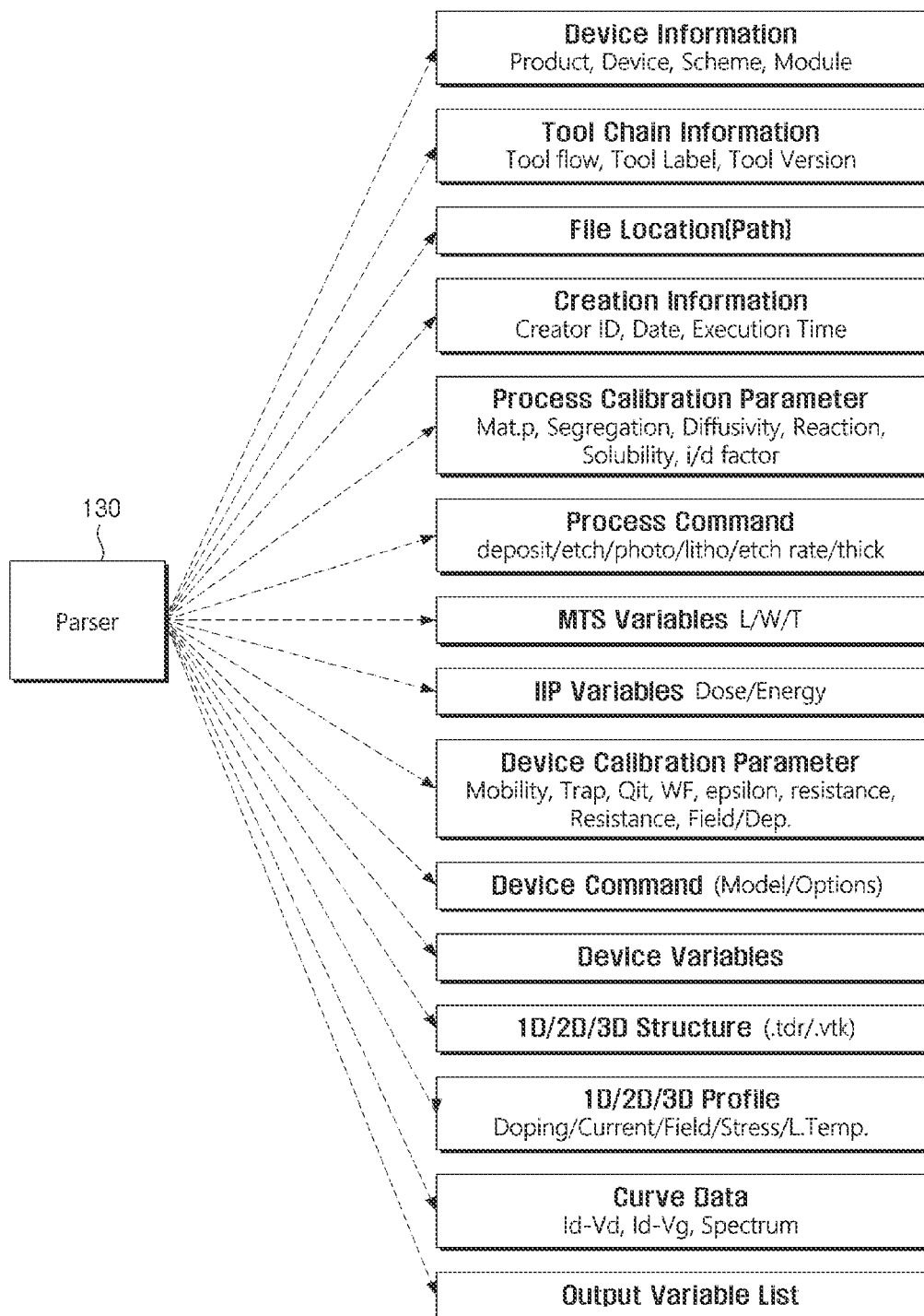
FIG. 4 is an example diagram illustrating the type of the data stored by a parser according to some embodiments.

FIG. 4 is an example diagram illustrating the type of the data stored by a parser according to some embodiments.

Referring to FIG. 4, the simulation data in which the error is recovered is parsed by the parser 130 and then loaded, as device information, tool chain information, a file location, creation information, a process calibration parameter, a process simulation script, MTS variables, implantation (IIP) variables, a device calibration parameter, a device simulation script, device-related variables, 1D/2D/3D structures, 1D/2D/3D profiles, curve data, a simulation result output variable list, or the like, in the database 200.

The device information loaded in the database 200 may be, e.g., a product including a semiconductor device, a semiconductor device, a design scheme, or a module. The tool chain information may be, e.g., a tool flow, a tool label, a tool version, or the like. The creation information may be, e.g., creator information, a creation date, an execution time, or the like. The process calibration parameter may be a material parameter, diffusivity, parameter related to characteristics (segregation, reaction, defect) used for other process simulation, or the like. The process simulation script may be, e.g., semiconductor recipe information such as deposition, etching, photo, exposure, an etch rate, a deposition thickness, or the like. The MTS variables may be, e.g., information related to the structure of the semiconductor device, a length, a width and a thickness of the semiconductor or the like. The implantation variables may be dose, implant energy, or the like. The device calibration parameter may be charge mobility in the semiconductor device, trap, charge, warpage, epsilon, a resistance, a field, a depth, or the like. The 1D/2D/3D profile may be an impurity doping concentration, a current, a field, stress, a temperature, or the like. The curve data may be a drain current-drain voltage graph, a drain current-gate voltage, a Vt (threshold voltage) spectrum, or the like.

Referring back to FIGS. 1 and 2, the hardware data module 140 collects the real data related to the actually manufactured semiconductor device. Real data may also be referred to herein as actual data or measured data from the manufactured device.

The preprocessing module 150 may preprocess the real data received from the hardware data module 140 into a format that may be utilized by simulation.

The real data preprocessed by the preprocessing module 150 may be transmitted to the data loader 160. The data loader 160 may store the preprocessed real data. The data loader 160 may periodically transmit the stored real data to the database 200.

The database 200 may store the real data and simulation data. The database 200 stores the real data generated or measured during a semiconductor device manufacturing process.

In other words, the database 200 may store the processing data or the measured data during an actual manufacturing process. The database 200 may include known variable parameters generated or measured during the actual manufacturing process and total variable data indicating variation of the data (e.g., on current and off current) as output after the actual manufacturing.

Further, the database 200 may store specification (spec) or standard related data. For example, the database 200 may include product spec data, spec data at the intermediate stage of a simulation, information on a standard process, or the like. Here, the spec data indicates a pre-defined quantitative range of each variable or output characteristic data. For example, the spec data may include the quantitative range of structural data. The information on the standard process may include steps to be included in a process simulation and information on the sequence of the steps.

The adjustment maintain module 300 may include a first graphical or graphic user interface 310, a simulation deck 320, a TCAD block 330, and a silicon model block 340. The terms "first," "second," etc., may be used herein merely to distinguish one element from another.

The structure of the first graphic user interface 310 will be described in detail with reference to FIG. 5.

Figure 5:
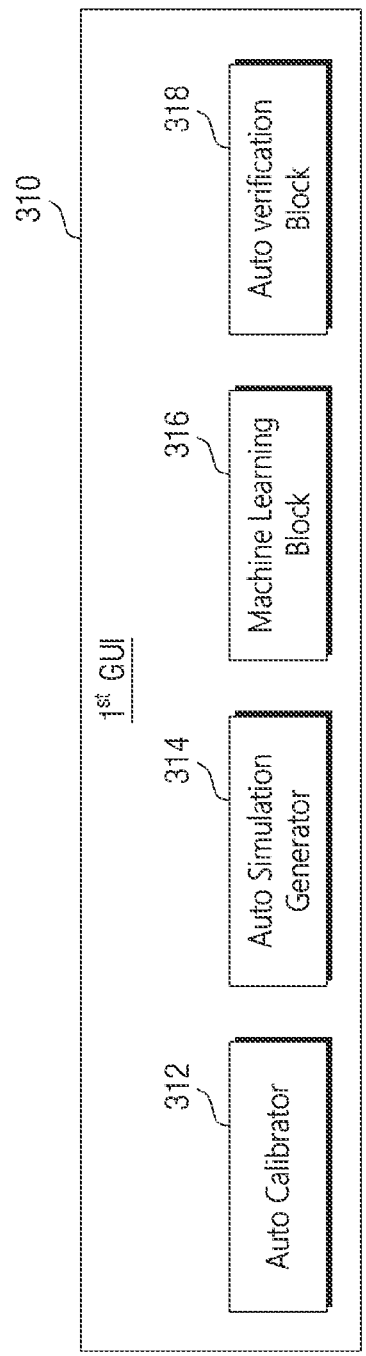
FIG. 5 is an example block diagram illustrating a first graphic user interface according to some embodiments.

FIG. 5 is an example block diagram illustrating a first graphic user interface according to some embodiments.

Referring to FIGS. 2 and 5, the first graphic user interface 310 includes an automatic calibrator 312, an automatic simulation generator 314, a machine learning block 316, and an automatic verification block 318.

The automatic calibrator 312 may compare the real data and the simulation data loaded in the database 200 using an automatic calibration function to maintain compatibility between the real data and the simulation data.

The automatic simulation generator 314 may generate a machine learning model of the recovery simulation data and the preprocessed real data and generate predicted real data therefrom.

The machine learning block 316 may perform machine learning using the preprocessed data. The machine learning may be performed using machine learning, e.g., decision tree learning, association rule learning, an artificial neural network (ANN), a genetic algorithm, inductive learning, a support vector machine (SVM), cluster analysis, a bayesian network, reinforcement learning, or the like, and/or may be performed using deep learning, e.g., a deep neural network (DNN), a convolutional neural network (CNN), a recurrent neural network (RNN), a restricted Boltzmann machine (RBM), a deep belief network (DBN), a deep Q-network, or the like.

The automatic verification block 318 may maintain the compatibility between the real data and the predicted real data generated by the automatic simulation generator 314. More specifically, the operation such as window shift, re-sampling, or the like is automatically performed until the model implemented by the machine learning block 316 satisfies predetermined criteria, e.g., as set by a user.

The above-described operation of the automatic calibrator 312 will be described in detail with reference to FIG. 6.

Figure 6:
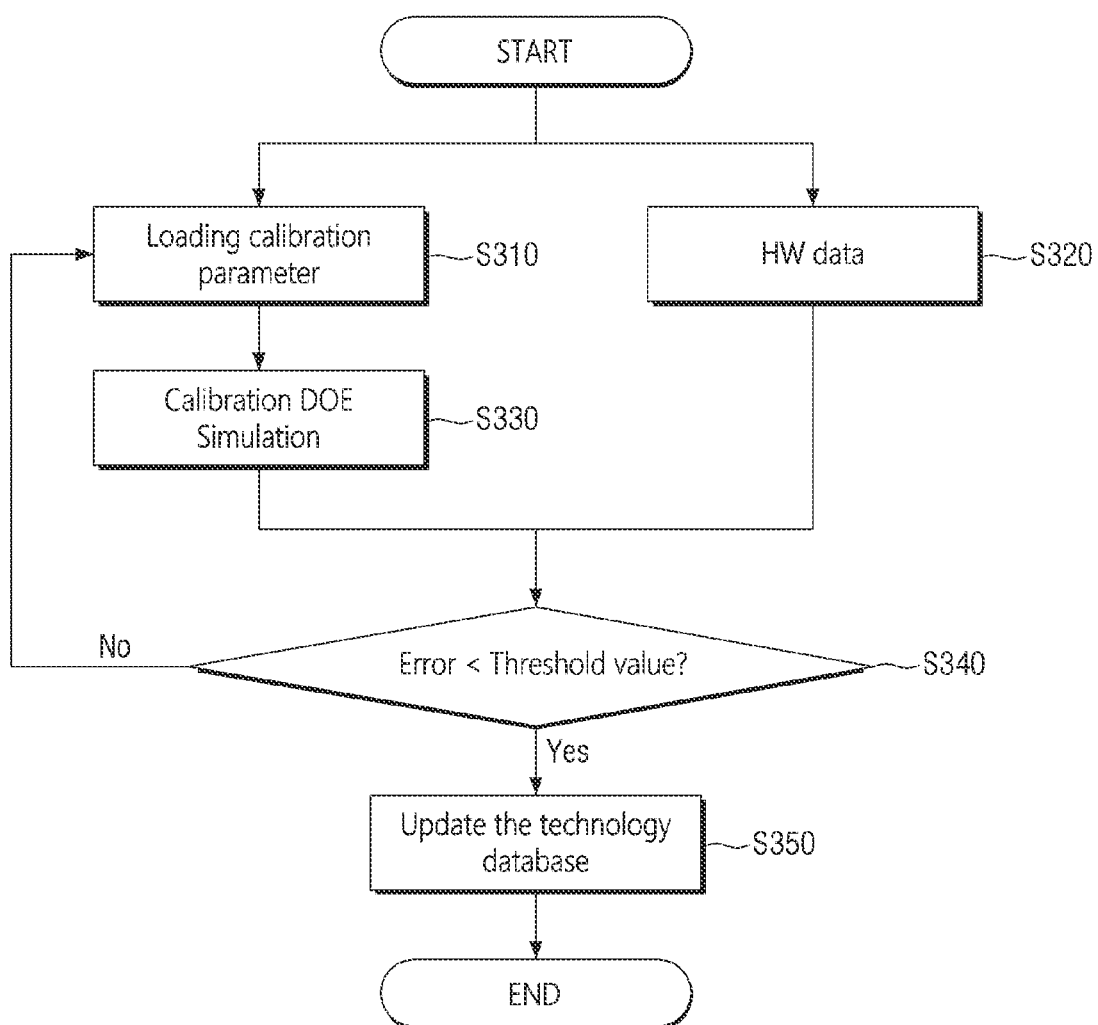
FIG. 6 is an example flowchart illustrating the operation of an automatic calibrator according to some embodiments.

FIG. 6 is an example flowchart illustrating the operation of an automatic calibrator according to some embodiments.

Referring to FIG. 6, the calibration parameter corresponding to the value of a semiconductor design variable is loaded (step S310). Further, the real data is loaded (step S320). The loaded calibration parameter may be simulated by a calibration design of experiment (DOE) (step S330). Then, the error between the calibration DOE simulation data and the real data is calculated to determine whether or not the error is smaller than the threshold value specified by the user (step S340). If it is determined that the error between the calibration DOE simulation data and the real data is not smaller than the threshold value (No), the calibration parameter is loaded again. If it is determined that the error between the calibration DOE simulation data and the real data is smaller than the threshold value (Yes), the calibration DOE simulation data is updated to the database 200 of FIG. 2 (step S350).

Referring back to FIGS. 1 and 2, the simulation deck 320 may store the predicted real data generated by the automatic simulation generator 314. The TCAD block 330 may store the data subjected to the machine learning based on the simulation data. The silicon model block 340 may store the data subjected to the machine learning based on the real data.

The virtualization visualization module 400 includes a decision block 410 and a second graphical or graphic user interface 420.

The decision block 410 receives the data subjected to the machine learning based on the simulation data from the TCAD block 330, receives the data subjected to the machine learning based on the real data from the silicon model block 340, and stores the received data.

The second graphic user interface 420 will be described in detail with reference to FIG. 7.

Figure 7:
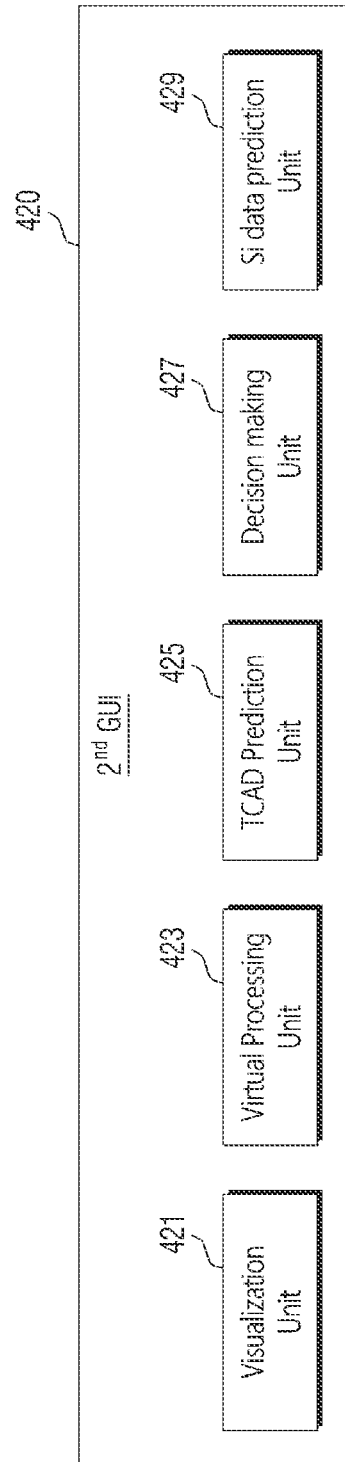
FIG. 7 is an example block diagram illustrating a second graphic user interface according to some embodiments.

FIG. 7 is an example block diagram illustrating a second graphic user interface according to some embodiments.

Referring to FIG. 7, the second graphic user interface 420 includes a visualization unit 421, a virtual processing unit 423, a TCAD prediction unit 425, a decision making unit 427, and a silicon data prediction unit 429.

The visualization unit 421 will be described in detail with reference to FIG. 8.

Figure 8:
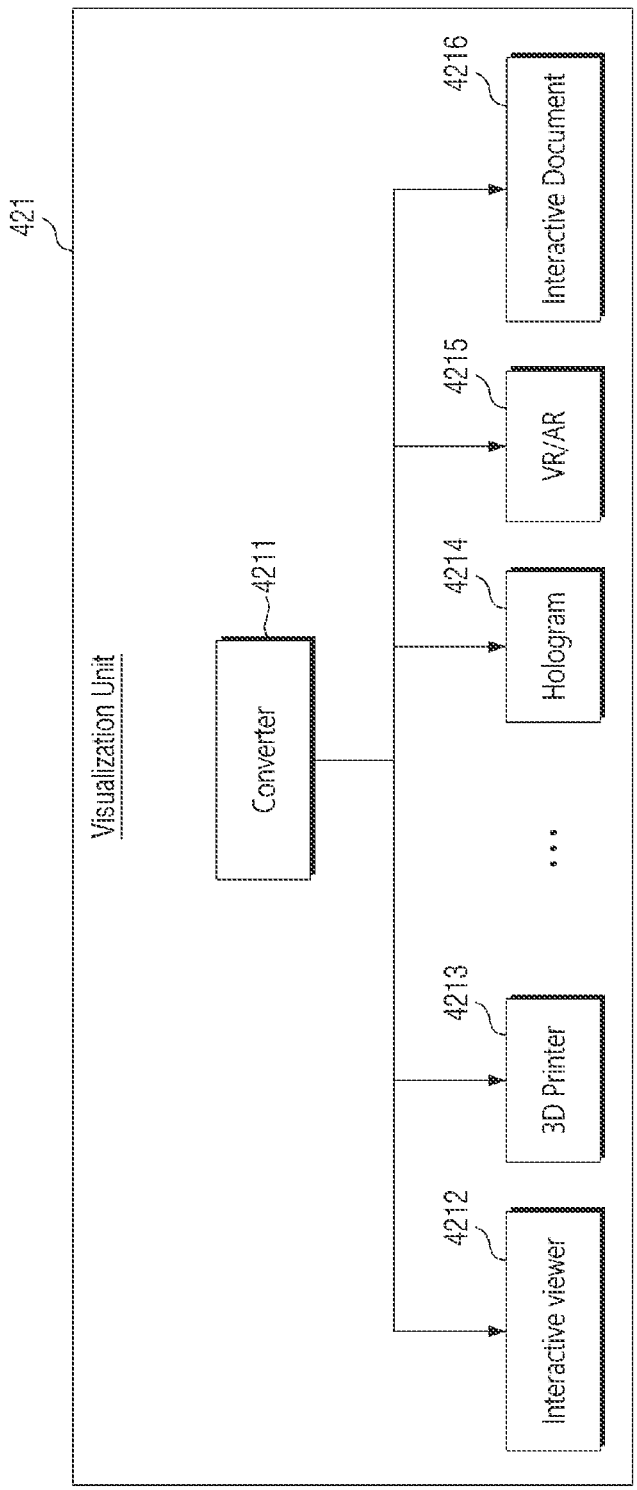
FIG. 8 is an example block diagram illustrating a visualization unit according to some embodiments.

FIG. 8 is an example block diagram illustrating a visualization unit according to some embodiments.

Referring to FIG. 8, the visualization unit 421 includes a converter 4211, an interactive viewer 4212, a 3D printer 4213, a hologram device 4214, a VR/AR device 4215, an interactive document 4216, or the like. The visualization unit 421 may generate predicted real data and a visualized virtualization process result from the machine learning model.

The converter 4211 may change the format of the predicted real data stored in the simulation deck 320 to a visualization format.

For example, the converter 4211 may change the format of the predicted real data generated by the automatic simulation generator 314 to a CAD format (e.g., vtk or stl) so that mechanical analysis such as Abaqus, Ansys, or the like may be performed.

For example, the converter 4211 may change the format of the predicted real data generated by the automatic simulation generator 314 to a Web GL format, and the interactive viewer 4212 may visualize the predicted real data generated by the automatic simulation generator 314.

In another example, the converter 4211 may change the format of the predicted real data generated by the automatic simulation generator 314 to a 3D printing format, and the 3D printer 4213 may visualize the predicted real data generated by the automatic simulation generator 314.

Figure 9:
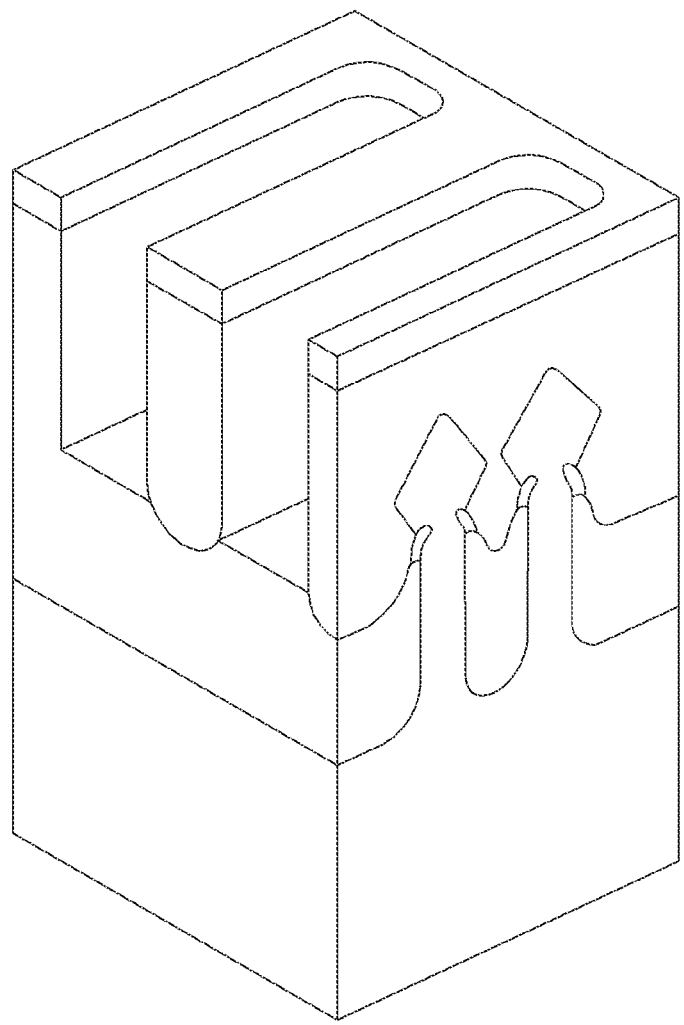
FIGS. 9 and 10 illustrate examples of the semiconductor device visualized by the visualization unit according to some embodiments.

FIG. 9 shows an example of the case where the converter 4211 changes the format of the predicted real data generated by the automatic simulation generator 314 to the Web GL format, and the interactive viewer 4212 visualizes the predicted real data generated by the automatic simulation generator 314. Further, FIG. 10 shows an example of the case where the converter 4211 changes the format of the predicted real data generated by the automatic simulation generator 314 to the 3D printing format, and the 3D printer 4213 visualizes the predicted real data generated by the automatic simulation generator 314.

Figure 10:
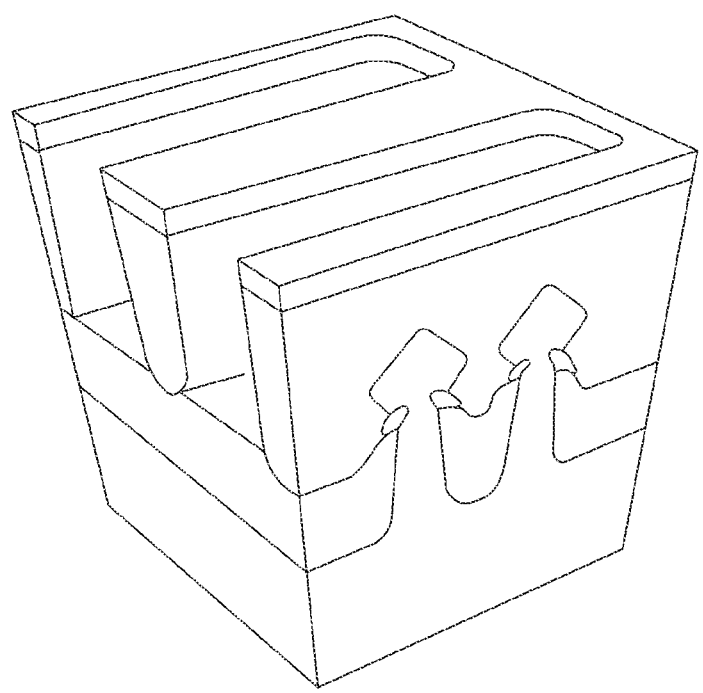

FIGS. 9 and 10 illustrate examples of the semiconductor device visualized by the visualization unit according to some embodiments.

Referring to FIGS. 8 and 9, in the example semiconductor device, the converter 4211 changes the format of the predicted real data generated by the automatic simulation generator 314 to the Web GL format, and the interactive viewer 4212 visualizes the predicted real data generated by the automatic simulation generator 314, as shown in the example of FIG. 9.

Referring to FIGS. 8 and 10, in the example semiconductor device, the converter 4211 changes the format of the predicted real data generated by the automatic simulation generator 314 to the 3D printing format, and the 3D printer 4213 visualizes the predicted real data generated by the automatic simulation generator 314, as shown in the example of FIG. 10.

Referring back to FIG. 8, for example, the converter 4211 may change the format of the predicted real data generated by the automatic simulation generator 314 to a hologram format, and the hologram device 4214 may visualize the predicted real data generated by the automatic simulation generator 314 as a hologram.

In another example, the converter 4211 may change the format of the predicted real data generated by the automatic simulation generator 314 to a virtual reality/augmented reality format, and the VR/AR device 4215 may visualize the predicted real data generated by the automatic simulation generator 314 as virtual reality and/or augmented reality.

In another example, the converter 4211 may change the format of the predicted real data generated by the automatic simulation generator 314 to a PDF 3D format or other interactive document format, and the interactive document 4216 may visualize the predicted real data generated by the automatic simulation generator 314 as PDF 3D.

Referring back to FIG. 7, the virtual processing unit 423 may perform a virtualization process using the predicted real data stored in the simulation deck 320, which was generated by the automatic simulation generator 314 from the data stored in the database 200. The TCAD prediction unit 425 may perform a TCAD simulation based on the data subjected to the machine learning based on the simulation data using the TCAD block 330 to perform a prediction simulation for the semiconductor device. The decision making unit 427 may determine simulation target data using the data subjected to the machine learning based on the simulation data which is received from the TCAD block 330 and stored in the decision block 410, and the data subjected to the machine learning based on the real data which is received from the silicon model block 340 and stored in the decision block 410. The silicon data prediction unit 429 may perform an actual semiconductor process based on the data subjected to the machine learning based on the real data stored in the silicon model block 340.

Figure 11:
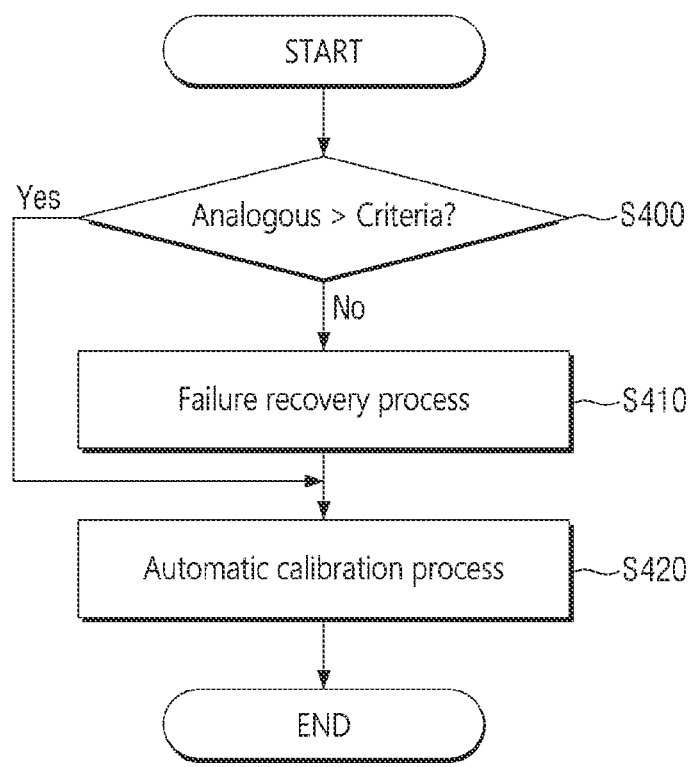
FIGS. 11 and 12 are example flowcharts illustrating an operation of reusing the database according to some embodiments.
Figure 12:
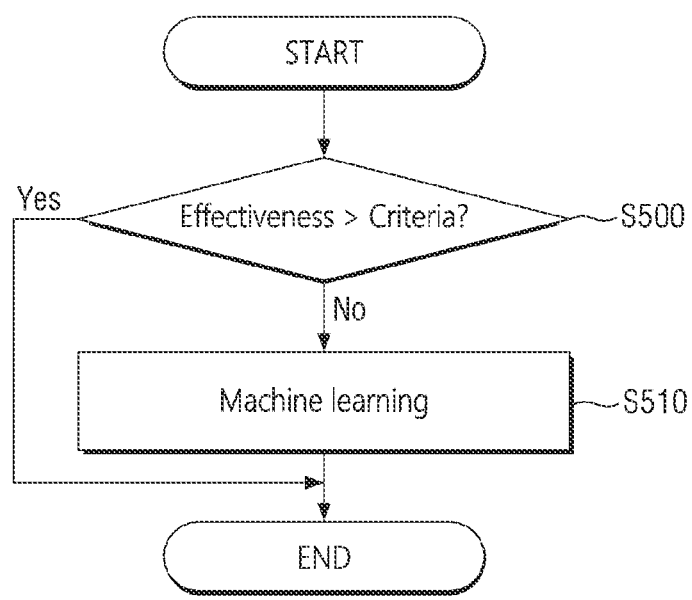

FIGS. 11 and 12 are example flowcharts illustrating an operation of reusing the database according to some embodiments.

Referring to FIGS. 2 and 11, the data stored in the database 200 of the semiconductor design automation system 10 according to some embodiments may be reused for designing another semiconductor device.

As an initial matter, it is determined whether or not a semiconductor device to be reused is analogous to the data stored in the database 200 (step S400). If a degree of analogy is higher than or equal to certain criteria (Yes), an automatic calibration process is performed immediately (step S420). Otherwise, an error or failure recovery process is performed on the data stored in the database 200 by the recovery module 120 (step S410). The automatic calibration process is performed on the data obtained by recovering or correcting the error of the data stored in the database 200 using the recovery module 120 (step S420).

Then, referring to FIGS. 2 and 12, the effectiveness of the data subjected to the automatic calibration process of FIG. 11 is determined (step S500). If it is determined that the effectiveness is higher than criteria (Yes), the corresponding data is visualized. Otherwise (No), the machine learning is performed (step S510). Then, the data subjected to the machine learning may be visualized.

Figure 13:
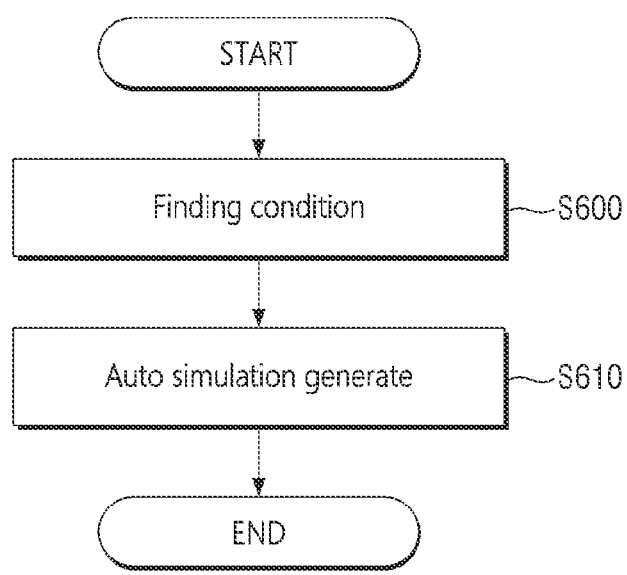
FIG. 13 is an example flowchart illustrating a visualization and virtualization operation according to some embodiments.

FIG. 13 is an example flowchart illustrating a visualization and virtualization operation according to some embodiments.

Referring to FIG. 13, in order to perform the visualization and virtualization operation using the second user interface, the data having the condition of the semiconductor device that performs the visualization and virtualization operation is found by loading the real data and the simulation data (step S600). Then, the automatic simulation is generated by the corresponding data (step S610).

Figure 14:
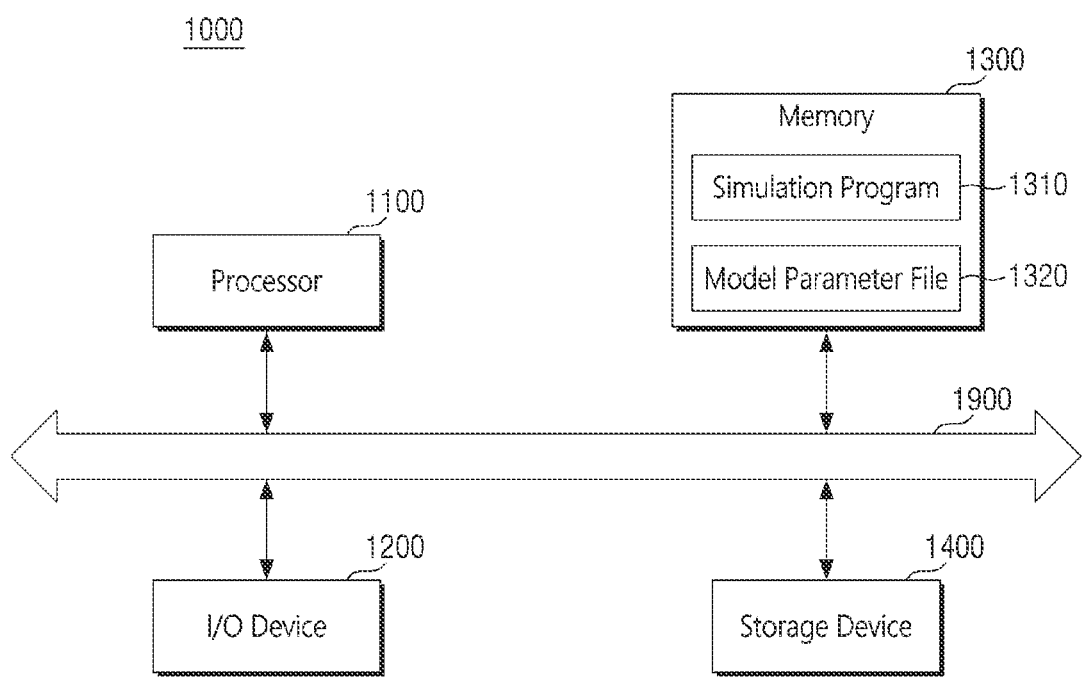
FIG. 14 is an example block diagram illustrating a computing system including a semiconductor design automation system according to some embodiments.

FIG. 14 is an example block diagram illustrating a computing system including a semiconductor design automation system according to some embodiments.

Referring to FIG. 14, a computing system 1000 including a semiconductor design automation system according to some embodiments may include a processor 1100, a memory 1300, an input/output device 1200, a storage device 1400, and a bus 1900. For example, the computing system 1000 may perform the semiconductor design automation operation described above with reference to FIGS. 1 to 13. In embodiments of the present disclosure, the computing system 1000 may be implemented as an integrated device, and thus may be referred to as an integrated circuit design apparatus. The computing system 1000 may be provided as a dedicated device for designing the integrated circuit of the semiconductor device, and/or may be a computer for driving various simulation tools or design tools. The computing system 1000 may be a fixed computing system such as a desktop computer, a workstation, a server, or the like, or may be a portable computing system such as a laptop computer or the like.

The processor 1100 may be configured to execute instructions for performing at least one of various operations for designing an integrated circuit. The processor 1100 may communicate with the memory 1300, the input/output device 1200, and the storage device 1400 through the bus 1900. The processor 1100 may execute application programs loaded in the memory 1300. For example, the processor 1100 may execute a simulation program 1310 in the memory 1300, and the simulation program 1310 may extract the electrical characteristics of the semiconductor device and the circuit including the semiconductor device.

The memory 1300 may store a program including a layout design for designing an integrated circuit and instructions for performing a simulation based on the designed layout. In one embodiment, the simulation program 1310 for extracting the electrical characteristics of the semiconductor device forming the integrated circuit and the circuit including the semiconductor device and a model parameter file 1320 may be loaded on the memory 1300. For example, the electrical characteristics of the semiconductor device may include the threshold voltage of a transistor, the on-current of the transistor, the current-voltage characteristics of the transistor, and the like.

The memory 1300 may further store various tools such as a simulation tool and the like. The memory 1300 may be a volatile memory such as a static random access memory (SRAM) or a dynamic RAM (DRAM), or may be a non-volatile memory such as a phase-change RAM (PRAM), a magnetic RAM (MRAM), a resistive RAM (ReRAM), a ferroelectrics RAM (FRAM), a flash memory, or the like.

The input/output device 1200 may receive and/or transmit signals based on user's input and output from user interface devices. For example, the input/output device 1200 may include an input device such as a keyboard, a mouse, a touch pad, or the like to receive integrated circuit design data. For example, the input/output device 1200 may include an output device such as a display, a speaker, or the like to display layout data, a simulation result, or the like.

The storage device 1400 may store a program such as the simulation program 1310 or the like and the model parameter file 1320. Before the program is executed by the processor 1100, the program or at least a part of the program may be loaded from the storage device 1400 to the memory 1300. The storage device 1400 may store the data to be processed by the processor 1100 or the data processed by the processor 1100. For example, the storage device 1400 may store the data to be processed by the simulation program 1310, e.g., the model parameter file 1320 in which the real data and/or the simulation data are stored, and the characteristic data of the semiconductor device generated by the simulation program 1310. The simulation program 1310 may extract the electrical characteristics of the semiconductor device included in the integrated circuit based on the information on the model parameter of the model parameter file stored in the storage device 1400.

The storage device 1400 may include a nonvolatile memory such as an electrically erasable programmable read-only memory (EEPROM), a flash memory, PRAM, RRAM, MRAM, FRAM, or may include a storage medium such as a memory card (MMC, eMMC, SD, MicroSD, or the like.), a solid state drive (SSD), a hard disk drive (HDD), a magnetic tape, an optical disk, a magnetic disk, or the like. Further, the storage device 1400 may be detachably attached to the computing system 1000 for designing an integrated circuit.

The bus 1900 may be a system bus for providing a network in a computer system. The processor 1100, the memory 1300, the input/output device 1200, and the storage device 1400 may be electrically connected, and may exchange data with one another through the bus 1900. However, the configuration of the bus 1900 is not limited to that in the above description and may further include relay units for efficient management.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "unit," or "system." Furthermore, aspects of the present disclosure may take the form of a computer program product embodied in one or more computer readable storage media having computer readable program code embodied thereon. A computer readable storage medium may be any tangible or non-transitory medium that can contain, or store a program for use by or in connection with an instruction execution system, apparatus, or device.

The present invention has been described herein with reference to flowchart and/or block diagram illustrations of methods, systems, and devices in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A computing system comprising:
a memory comprising a non-transitory computer readable storage medium configured to store a semiconductor design automation simulation program; and
a processor configured to execute the semiconductor design automation simulation program,
wherein the semiconductor design automation simulation program comprises:
an automation module configured to generate simulation data and real data;
a database configured to store the simulation data and the real data;
an adjustment maintain module comprising an automatic calibrator configured to compare the simulation data with the real data and update the simulation data of the database responsive to determining that an error between the simulation data and the real data is smaller than a threshold value, and an automatic simulation generator configured to generate a machine learning model of the simulation data and the real data stored in the database and generate predicted real data from the machine learning model; and
a virtualization visualization module configured to visualize the predicted real data.

2. The computing system of claim 1,
wherein the adjustment maintain module further comprises a simulation deck configured to store the predicted real data and provide the predicted real data to the virtualization visualization module.

3. The computing system of claim 1,
wherein the virtualization visualization module comprises a virtual processing unit configured to perform a virtualization process based on the predicted real data.

4. The computing system of claim 1,
wherein the adjustment maintain module further comprises an automatic verification block configured to execute a window shift operation or a re-sampling operation automatically until the machine learning model satisfies predetermined criteria.

5. The computing system of claim 4,
wherein the automatic verification block is configured to update the machine learning model which satisfies the predetermined criteria to the database.

6. The computing system of claim 1, wherein
the virtualization visualization module comprises:
a visualization unit configured to generate a visualized virtualization process result from the machine learning model, and
wherein the visualization unit comprises a converter configured to change a format of the predicted real data into a visualization format to visualize the visualized virtualization process result.

7. The computing system of claim 6, wherein
the visualization format comprises a 3D printing format.

8. The computing system of claim 6, wherein
the visualization format comprises a hologram format.

9. The computing system of claim 1, wherein the automation module comprises:
a simulator configured to generate a former simulation data;
a recovery module configured to correct a sampling error of the former simulation data to generate the simulation data; and
a hardware data module configured to generate a former real data;
a preprocessing module configured to preprocess the former real data to generate the real data.

10. A computing system comprising:
a memory comprising a non-transitory computer readable storage medium configured to store a semiconductor design automation simulation program; and
a processor configured to execute the semiconductor design automation simulation program,
wherein the semiconductor design automation simulation program comprises:
a simulator configured to generate simulation data of semiconductor device modeling;
a database configured to store the simulation data and real data of an actually manufactured semiconductor device;
an adjustment maintain module comprising an automatic simulation generator configured to generate a machine learning model of the simulation data and the real data stored in the database and generate predicted real data from the machine learning model; and
a virtualization visualization module configured to visualize the predicted real data.

11. The computing system of claim 10,
wherein the semiconductor design automation simulation program further comprises:
an automation module configured to provide the simulation data and the real data to the database;
wherein the automation module comprises:
a recovery module configured to correct a sampling error of a former simulation data to generate the simulation data; and
a preprocessing module configured to preprocess a former real data to generate the real data.

12. The computing system of claim 11,
wherein the automation module further comprises:
a parser configured to receive the simulation data from the recovery module and perform parsing of the simulation data.

13. The computing system of claim 11,
wherein the automation module further comprises:
a data loader configured to periodically receive the real data from the preprocessing module and periodically transmit the real data to the database.

14. The computing system of claim 10, wherein
the adjustment maintain module further comprises an automatic calibrator configured to compare the simulation data with the real data and update the simulation data of the database responsive to determining that an error between the simulation data and the real data is smaller than a threshold value.

15. A computing system comprising:
an input/output device;
a storage device configured to store a semiconductor design automation simulation program; and
a processor configured to execute the semiconductor design automation simulation program,
wherein, when the semiconductor design automation simulation program is executed, the processor performs a semiconductor device modeling to generate simulation data,
corrects a sampling error of the simulation data to generate recovery simulation data,
receives real data from the input/output device,
preprocesses the real data to generate preprocessed real data,
generates a machine learning model of the recovery simulation data and the preprocessed real data to generate predicted real data from the machine learning model,
visualizes the predicted real data to generates a visualized virtualization process result, and
controls the input/output device to output the visualized virtualization process result.

16. The computing system of claim 15, wherein, when the semiconductor design automation simulation program is executed,
the processor executes a window shift operation or re-sampling operation automatically until the machine learning model satisfies predetermined criteria, and
updates and stores the machine learning model which satisfies the predetermined criteria.

17. The computing system of claim 15, further comprising:
a memory,
when the semiconductor design automation simulation program is executed, the processor loads the semiconductor design automation simulation program on the memory.

18. The computing system of claim 15, wherein, when the semiconductor design automation simulation program is executed,
the processor performs a virtualization process based on the predicted real data.

19. The computing system of claim 15, wherein, when the semiconductor design automation simulation program is executed,
the processor calibrates the recovery simulation data with a calibration parameter,
compares the recovery simulation data with the preprocessed real data, and updates the recovery simulation data responsive to determining that an error between the recovery simulation data and the preprocessed real data is smaller than a threshold value.

20. The computing system of claim 15, wherein, when the semiconductor design automation simulation program is executed, the processor performs machine learning using the preprocessed real data, performs machine learning using the recovery simulation data, performs a TCAD simulation based on data subjected to the machine learning based on the recovery simulation data, and performs an actual semiconductor process based on data subjected to the machine learning based on the preprocessed real data.

\* \* \* \* \*